Sept. 20, 1932.   A. L. KNAPP   1,877,769
MOTOR VEHICLE
Filed May 2, 1928   2 Sheets-Sheet 1
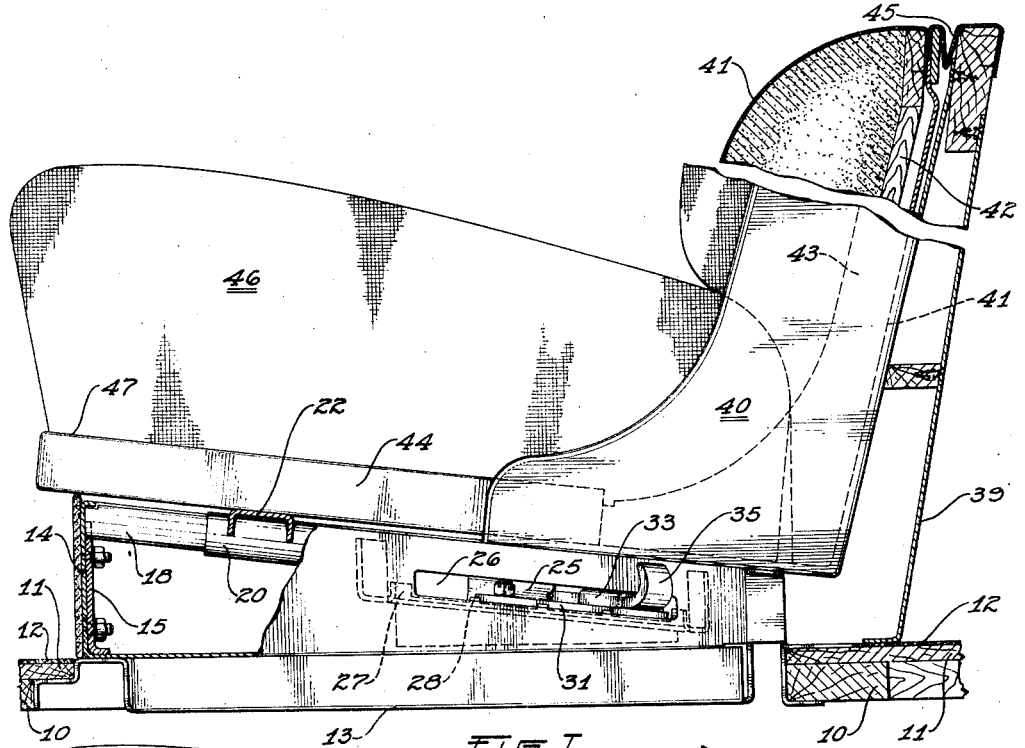
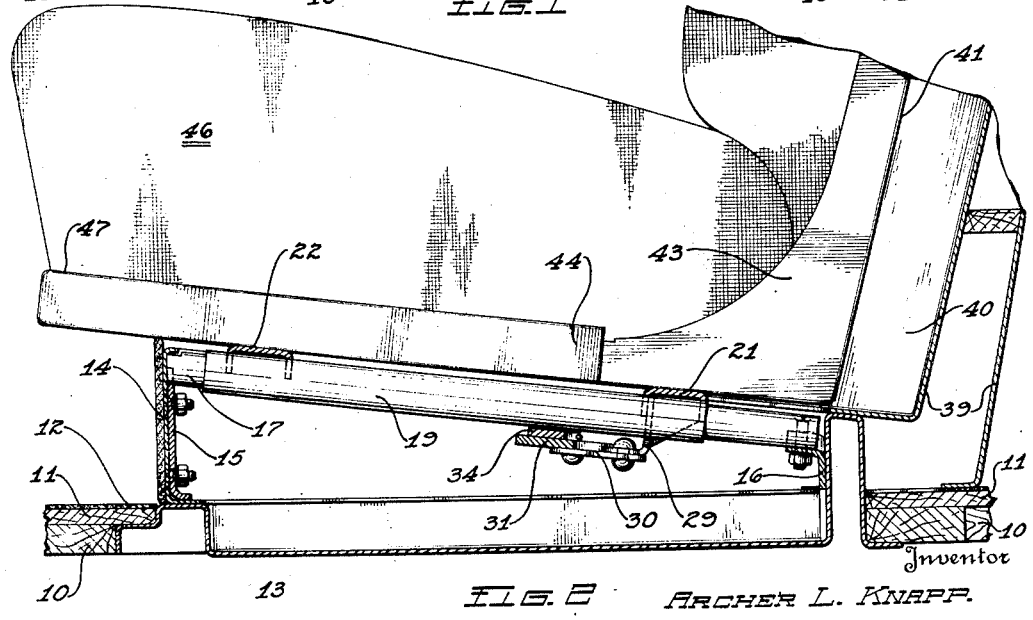
Inventor
ARCHER L. KNAPP.

Sept. 20, 1932.  A. L. KNAPP  1,877,769
MOTOR VEHICLE
Filed May 2, 1928  2 Sheets-Sheet 2
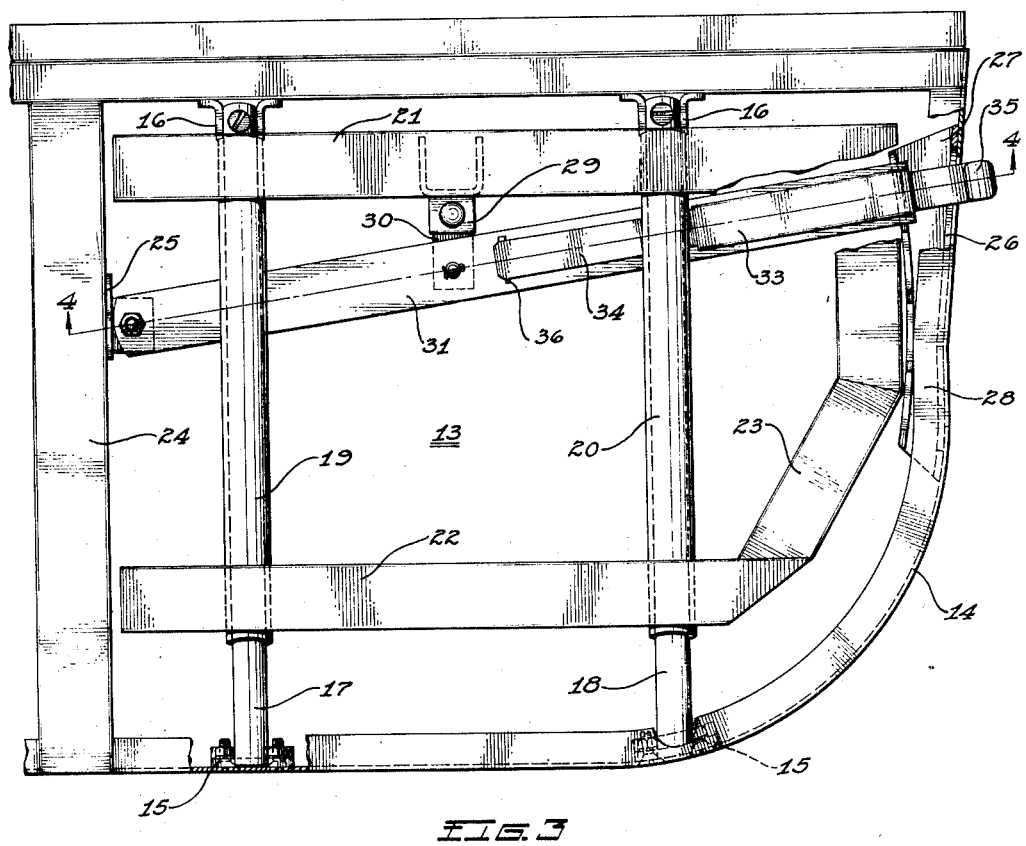
FIG. 3
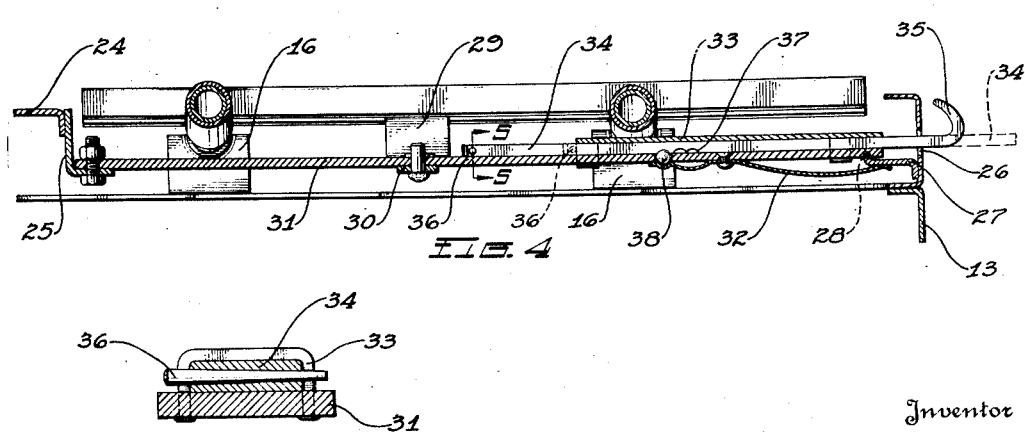
FIG. 4
FIG. 5
Inventor
ARCHER L. KNAPP
By Milton Tibbets
Attorney Patented Sept. 20, 1932

1,877,769

UNITED STATES PATENT OFFICE

ARCHER L. KNAPP, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed May 2, 1928. Serial No. 274,420.

This invention relates to motor vehicles and more particularly to body structure.

An object of the invention is to provide a seat for a motor vehicle body adjustable longitudinally with respect thereto.

Another object of the invention is to provide an adjustable seat having means whereby it may be shifted forwardly and backwardly at the will of the operator and locked in the adjusted position.

Another object of the invention is to provide an adjustable seat for the operator of a motor vehicle arranged for longitudinal adjustment by means of a lever concealed beneath the seat and extending from one side thereof.

A further object of the invention is to provide an adjustable seat for the operator of a motor vehicle provided with a telescopic lever by means of which the seat may be adjusted forwardly or backwardly at the will of the operator and the lever locked and concealed beneath the seat.

A further object of the invention is to provide an adjustable seat for the operator of a motor vehicle having means whereby the seat may be easily and quickly adjusted to a desired position and to simplify the adjustment means, the means for mounting the seat and the guideways upon which the seat reciprocates.

Other objects of the invention will appear in the following description taken in connection with the drawings, which form a part of this specification, and in which:

Figure 1 is a side elevation of a driver's seat, partly broken away and partly in section, illustrating the invention as applied, Figure 2 is a similar view illustrating the mounting of the seat, the seat being adjusted to the maximum forward position, Figure 3 is a top plan view of the seat frame, Figure 4 is a sectional view taken substantially on line 4—4, Fig. 3, and Figure 5 is a sectional view taken on line 5—5, Fig. 4.

Referring to the drawings for more specific details of the invention, 10 represents the cross sills of a motor vehicle body frame and 11 the floor boards of the body. As shown, the floor boards have a covering 12 of carpet or other suitable material. Secured between the sills 10 is a seat compartment 13 and positioned above the compartment is a seat frame base comprising a shell 14 surrounding the compartment 13. Bolted or otherwise secured to the shell are suitable supports 15 and 16 arranged in oppositely disposed pairs. The pair of supports 15 extends above the pair of supports 16 so that tubular guide members 17 and 18 suitably secured thereto are supported in an inclined position, and mounted to reciprocate freely on the guides 17 and 18 are sleeves 19 and 20.

Permanently secured on the sleeves 19 and 20 for reciprocatory movement therewith is a seat frame comprising transverse members 21 and 22 braced together as indicated at 23, or other suitable bracing means may be employed. Supported by the shell 14 is a transverse member 24 having positioned thereon a bracket 25, and positioned on one side of the shell beneath a slot 26 is a support or bracket 27 having formed thereon a ratchet 28 which extends upwardly above the lower side of the slot. A bracket 29 is positioned on the transverse member 21 and pivoted thereto by a suitable link 30 is a bar 31, one end of which is pivotally connected to the bracket 25 and the other end engages the ratchet 28 on the bracket 27 where it is retained by a leaf spring 32 positioned on the bar 31 with one of its ends in engagement with the under surface of the bracket 27.

The bar 31 has suitably secured thereon at the end engaging the ratchet 28 a housing 33 having slidably positioned therein an arm 34 which extends through the slot 26 and is provided upon its outwardly extended end with a pull 35. The arm 34 is adapted to be moved inwardly and outwardly or to telescope with respect to the housing and is limited in its outward movement by a pin 36 positioned in the end thereof and adapted to engage the housing. Arranged intermediate the ends of the arm 34 is a plurality of depressions 37 adapted for engagement by a ball 38 positioned in an aperture in the bar 31 and urged in engagement with the depressions by the leaf spring 32.

The bar 31 and the arm 34 carried thereby provide a telescopic lever for adjusting the seat forwardly or backwardly at the will of the operator. This telescopic feature of the lever provides means whereby the length of the lever may be increased to afford ease in the operation thereof and also means of concealing the lever after the seat has been adjusted to a desired position. The spring pressed ball engaging the depressions in the arm 34 provides means for securing the arm against displacement when not in use and prevents any vibration between these parts tending to cause a disagreeable noise.

Secured on the back of the shell 14 with a suitable bearing on the floor of the body is a seat back 39 provided with suitable side flanges 40 between which a primary back 41 reciprocates. The primary back 41 comprises a frame 42 having side flanges 43 which fit snugly against the flanges 40 on the secondary back. The back frame is permanently secured to a cushion frame 44 and is provided with a bellows 45 connecting the top thereof to the top of the secondary back, the bellows being formed of upholstery cloth. This bellows permits the movement of the primary back forwardly or backwardly without a complete separation of the primary back from the secondary back and lends a finished appearance to the top of the back in any adjusted position of the seat. Positioned on the cushion frame 44 is a cushion 46 secured against displacement by a suitable retaining strip 47 formed on the frame 44. The frame 44 is permanently secured to the transverse members 21 and 22, hence, any movement imparted to the seat frame by means of the lever will be imparted to the seat and the back carried thereby.

In operation, the arm 34 constituting a part of the operating lever is drawn outwardly by means of the pull 35 until the pin 36 carried thereby engages the end of the housing 33. Upon slightly raising the arm 34 and the bar 31 to which it is attached, the bar 31 is disengaged from the ratchet 28 on the bracket 27. With the lever in this raised position, it may be freely moved forwardly or backwardly to adjust the seat to any desired position longitudinally of the body. After adjusting the seat, the arm 34 is lowered so that the bar 31 engages a notch in the ratchet where it is securely retained by the leaf spring 32 engaging the under surface of the bracket 27. The arm 34 is then pushed inwardly to a position where the spring pressed ball in the bar engages one of the depressions 33 in the arm 34, according to the adjusted position of the arm, where it is held against displacement and against rattling.

Although this invention has been described in connection with certain specific embodiments, the principles involved are susceptible of numerous other applications as will readily occur to persons skilled in the art. The invention is, therefore, to be limited only as indicated by the scope of the appended claims.

Having thus described the various features of my invention, what I claim as new and desire to secure by Letters Patent is:

1. An adjustable seat comprising a base, a plurality of parallel tubular members, sleeves slidably mounted on the tubular members, a seat frame permanently secured to the sleeves, a seat positioned on the frame, a lever having one end pivotally secured to the base, a linkage connecting the lever with the seat frame and a telescopic arm carried by the lever extending through a slot in the base and a ratchet for retaining the lever in a plurality of positions.

2. An adjustable seat comprising a base, a stationary back associated therewith, parallel flanges on the stationary back, a seat frame mounted for reciprocation on the base, a back carried by the seat frame positioned between the flanges on the stationary back, a bellows connecting the back carried by the seat frame and the stationary back and a lever for reciprocating the seat frame.

3. In a motor vehicle, in combination with a body, a seat positioned in the body, the seat comprising a base, a plurality of tubular members positioned on the base, sleeves slidably mounted on the tubular members, a frame permanently secured to the sleeves, a seat positioned on the frame, a lever pivoted to the base, a linkage connecting the lever to the seat frame, an arm telescoping with the lever and extending through a slot in the base and a ratchet for retaining the lever in a plurality of positions.

4. In a motor vehicle, in combination with a body, a seat positioned in the body, the seat comprising a base, a plurality of parallel members arranged on the base in an inclined position, sleeves slidably mounted on the parallel members, a seat frame permanently secured to the sleeves, a seat positioned on the frame, a lever pivoted to a fixed member, a linkage connecting the lever to the seat frame, a ratchet engaging the lever and a telescopic arm on the lever extending through a slot in the base and means carried by the lever for retaining the telescopic arm in a plurality of positions.

In testimony whereof I affix my signature.

ARCHER L. KNAPP.